(12) United States Patent
Zymelka

(10) Patent No.: US 11,585,070 B2
(45) Date of Patent: Feb. 21, 2023

(54) DE-TRENCHING APPARATUS

(71) Applicant: Zytech LTD Brooklands, Colchester (GB)

(72) Inventor: Antony Zymelka, Colchester (GB)

( * ) Notice: Subject to any disclaimer, the term of this patent is extended or adjusted under 35 U.S.C. 154(b) by 0 days.

(21) Appl. No.: 16/758,651

(22) PCT Filed: Oct. 25, 2018

(86) PCT No.: PCT/GB2018/053091
§ 371 (c)(1),
(2) Date: Apr. 23, 2020

(87) PCT Pub. No.: WO2019/081938
PCT Pub. Date: May 2, 2019

(65) Prior Publication Data
US 2020/0347572 A1 Nov. 5, 2020

(30) Foreign Application Priority Data
Oct. 25, 2017 (GB) ...................... 1717560

(51) Int. Cl.
| | | |
|---|---|---|
| *E02F 5/00* | (2006.01) | |
| *E02F 3/88* | (2006.01) | |
| *E02F 3/92* | (2006.01) | |
| *E02F 5/14* | (2006.01) | |
| *F16L 1/16* | (2006.01) | |
| *F16L 1/26* | (2006.01) | |
| *H02G 1/00* | (2006.01) | |
| *H02G 9/08* | (2006.01) | |

(52) U.S. Cl.
CPC ............ *E02F 5/003* (2013.01); *E02F 3/8816* (2013.01); *E02F 3/8866* (2013.01); *E02F 3/9218* (2013.01); *E02F 5/006* (2013.01); *E02F 5/145* (2013.01); *F16L 1/166* (2013.01); *F16L 1/26* (2013.01); *H02G 1/00* (2013.01); *H02G 9/08* (2013.01)

(58) Field of Classification Search
CPC . E02F 5/003; E02F 5/006; E02F 5/145; E02F 3/8816; E02F 3/8866; E02F 3/9218; F16L 1/166; H02G 1/00
See application file for complete search history.

(56) References Cited

U.S. PATENT DOCUMENTS

| | | | | |
|---|---|---|---|---|
| 2,875,585 | A * | 3/1959 | Little ...................... | E02F 5/104 405/161 |
| 4,087,981 | A * | 5/1978 | Norman .................. | E02F 5/105 37/335 |
| 2014/0283420 | A1* | 9/2014 | Patriciu ................. | E02F 3/8866 37/308 |

* cited by examiner

*Primary Examiner* — Tara Mayo-Pinnock
(74) *Attorney, Agent, or Firm* — Cionca IP Law P.C.; Marin Cionca

(57) ABSTRACT

De-trenching apparatus (100) for extracting a buried line, such as a cable or pipeline, is disclosed. The de-trenching apparatus comprises a channel (112) configured to receive a buried line to be extracted, the channel comprising a first flared opening (114) at a front end of the de-trenching apparatus and a second flared opening (115) at the rear end of the de-trenching apparatus, the first and second flared openings each having a curved surface (111) configured to support the line during extraction, and material removal means for removing material from around the buried line ahead of the de-trenching apparatus.

17 Claims, 1 Drawing Sheet

DE-TRENCHING APPARATUS

CROSS REFERENCE TO RELATED APPLICATIONS

This application is a National Phase of International Application No. PCT/GB2018/053091, filed Oct. 25, 2018, and that International Application was published under PCT Article 21(2) in English. This application also includes a claim of priority to Application No. GB 1717560.5., filed Oct. 25, 2017, the entirety of which is hereby incorporated by reference.

TECHNICAL FIELD

The present invention relates to de-trenching apparatus for extracting a buried line, for example a cable or pipeline.

BACKGROUND

Pipelines or cables, such as subsea or land-based power cables, telecommunications cables or umbilical cables, are often buried in the seabed or ground. The material surrounding a buried line, such as a cable or pipeline, affords a degree of mechanical protection. However, when a buried cable or pipeline does become damaged, it is necessary to recover the damaged section of the line in order to carry out repairs. The process of extracting a buried line from the ground or seabed can be referred to as 'de-trenching'For example, a cable de-trenching operation typically involves exposing a part of the cable where the fault is thought to have occurred, cutting the cable, and recovering and testing the cut end of the cable. The cable can then be repaired and re-buried.

When de-trenching a buried line it is important to ensure that any part of the line that is disturbed during the de-trenching operation does not have its handling parameters compromised at any time during the process. For example, if part of the line is bent by more than the minimum bend radius (MBR) specified for the line, that part of the line may be mechanically damaged or weakened, potentially leading to a failure of the cable or pipeline. Such failure might be immediate or might not occur until a certain time after the original repair operation has been completed, for example weeks, months or even years later.

SUMMARY OF THE INVENTION

According to a first aspect of the present invention, there is provided a de-trenching apparatus for extracting a buried line, the apparatus comprising a channel configured to receive a buried line to be extracted, the channel comprising a first flared opening at the front end of the de-trenching apparatus and a second flared opening at the rear end of the de-trenching apparatus, the first and second flared openings each having a curved surface configured to support the line during extraction, and material removal means for removing material from around the buried line ahead of the de-trenching apparatus.

In some embodiments according to the first aspect, the curved surface of the first and/or the second flared opening has a radius of curvature greater than or equal to a minimum bend radius MBR of the line to be extracted.

In some embodiments according to the first aspect, the material removal means comprises one or more nozzles configured to direct one or more fluid jets towards the material to be removed.

In some embodiments according to the first aspect, one or more nozzles are oriented such that a reaction force exerted on the de-trenching apparatus by the one or more fluid jets can assist in aligning the de-trenching apparatus and/or assist with propelling the de-trenching apparatus along the buried line.

In some embodiments according to the first aspect, the one or more nozzles are configured to be connected to a pressurised fluid source to generate the fluid jet to lift the material from around the buried line.

In some embodiments according to the first aspect, the de-trenching apparatus further comprises the pressurised fluid source, connected to the one or more nozzles.

In some embodiments according to the first aspect, the body is configured to be opened so as to permit a continuous length of the line to be placed into the channel, the body then being closed around the line.

In some embodiments according to the first aspect, the de-trenching apparatus can further comprise one or more sensors configured to monitor a status of the line and/or the de-trenching apparatus during a de-trenching operation.

In some embodiments according to the first aspect, the one or more sensors can comprise: an imaging sensor configured to capture an image of the line and/or the de-trenching apparatus during the de-trenching operation; and/or a tension meter configured to measure a tension in the line during the de-trenching operation; and/or an inclinometer configured to measure an inclination of the line de-trenching apparatus during the de-trenching operation; and/or a sonar sensor configured to detect the buried line during the de-trenching operation: and/or an acoustic positioning device to provide location information about a location of the de-trenching apparatus to a control vehicle and/or a recovery vehicle.

In some embodiments according to the first aspect, the de-trenching apparatus further comprises an umbilical cable for connecting the de-trenching apparatus to a control vehicle.

In some embodiments according to the first aspect, the umbilical cable is configured to carry signals from the one or more sensors to the control vehicle.

In some embodiments according to the first aspect, the umbilical cable is configured to connect the one or more nozzles to the pressurised fluid source on the control vehicle.

In some embodiments according to the first aspect, the de-trenching apparatus further comprises attachment means configured to attach the de-trenching apparatus to a lifting cable for supporting the de-trenching apparatus during a de-trenching operation.

In some embodiments according to the first aspect, the umbilical cable is connected to the lifting cable at a plurality of attachment points such that the umbilical cable is supported by the lifting cable.

In some embodiments according to the first aspect, the apparatus is configured to extract a buried cable or pipeline.

According to a second aspect of the present invention, there is provided a recovery system for extracting a buried line, the system comprising de-trenching apparatus according to the first aspect, and a control vehicle connected to the de-trenching apparatus by the umbilical cable and/or by the lifting cable. In some embodiments according to the second aspect, the control vehicle is a submersible vehicle. Alternatively, in another embodiment according to the second aspect, the control vehicle is a surface vessel configured to receive the buried line extracted by the de-trenching apparatus.

BRIEF DESCRIPTION OF THE DRAWINGS

Embodiments of the present invention will now be described, by way of example only, with reference to the accompanying drawings, in which.

DETAILED DESCRIPTION

Figure 1:
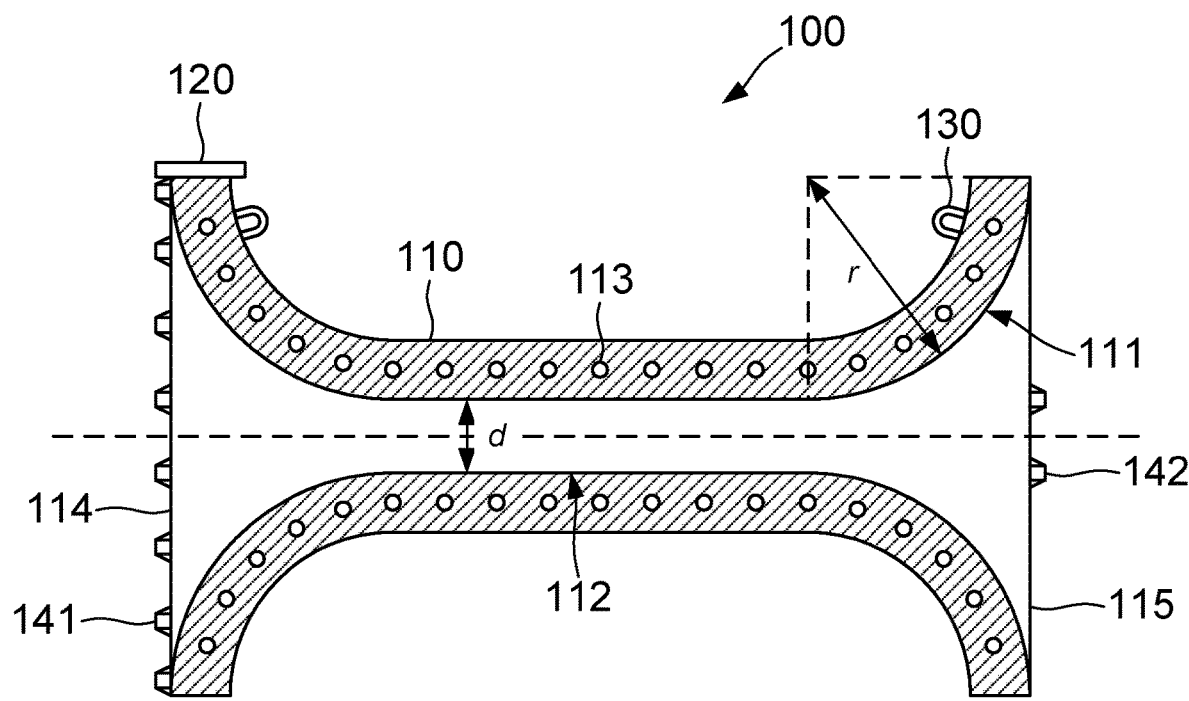
FIG. 1 illustrates a cross-sectional view of a de-trenching apparatus, according to an embodiment of the present invention.

In the following detailed description, only certain exemplary embodiments of the present invention have been shown and described, simply by way of illustration. As those skilled in the art would realise, the described embodiments may be modified in various different ways, all without departing from the scope of the present invention. Accordingly, the drawings and description are to be regarded as illustrative in nature and not restrictive. Like reference numerals designate like elements throughout the specification.

Figure 2:
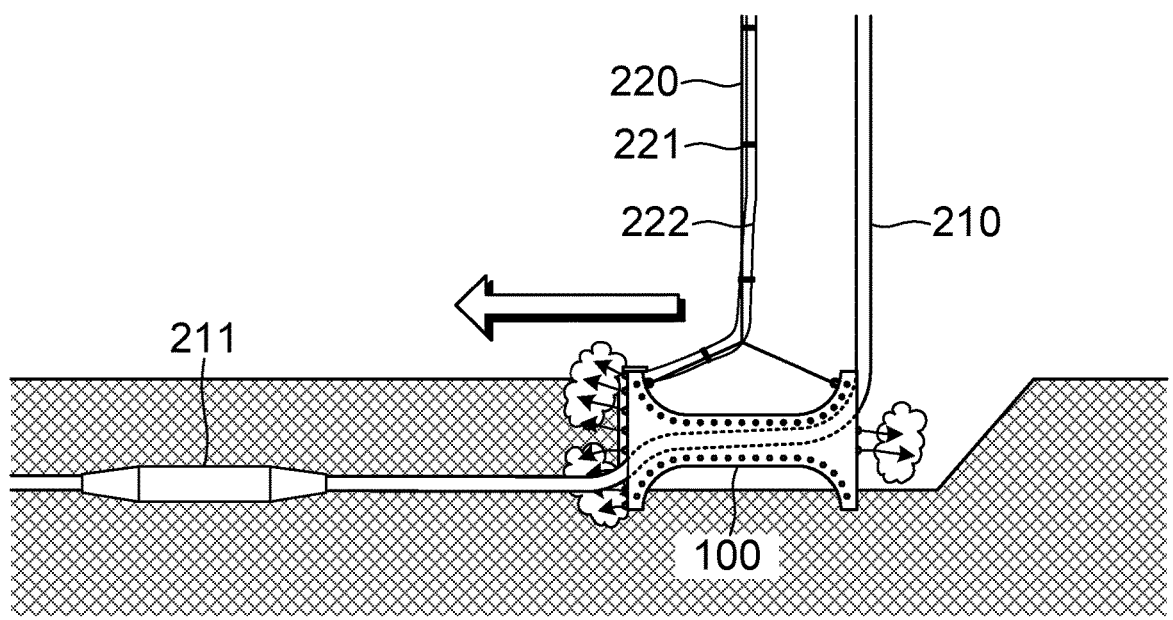
FIG. 2 illustrates the de-trenching apparatus during use, according to an embodiment of the present invention.

FIG. 1 illustrates a cross-sectional view of an apparatus according to an embodiment of the present invention. FIG. 2 illustrates the de-trenching apparatus during use. The apparatus can be used to extract a buried line, for example a buried cable or pipeline, and is hereinafter referred to as a de-trenching apparatus. Embodiments of the present invention can be used to de-trench any type of buried lines, including but not limited to subsea or land-based power cables, telecommunications cables, umbilical cables, or oil/gas pipelines.

The apparatus 100 comprises a channel 112 configured to receive a buried line 210 to be extracted. The channel 112 passes from one side of the de-trenching apparatus 100 to the other, allowing the line 210 to pass through the apparatus 100. In the present embodiment the channel 112 comprises flared openings 114, 115 at the front and rear ends of the channel 112. The de-trenching apparatus 100 further comprises material removal means 141 for removing material from around the buried line 210 ahead of the de-trenching apparatus 100.

The material removal means 141 can be used to remove material from around the buried line 210 without damaging the line 210. The material removal means allows the de-trenching apparatus 100 to open up the trench, thereby exposing the buried line 210 and allowing the line 210 to be extracted from the ground or seabed. In the present embodiment the material removal means 141 comprises a plurality of nozzles 141 mounted on the front face 114 of the apparatus 100. In other embodiments any number of one or more nozzles may be provided. The plurality of nozzles 141 are configured to direct jets of fluid towards the material to be removed, ahead of the de-trenching apparatus 100. Depending on the embodiment, the fluid may be a gas or a liquid.

The effect of the fluid jets on the material in which the line 210 is buried can vary according to the type of material and the pressure of the fluid. The jets may be adapted to increase their efficiency in different seabed/soil conditions. For example, a high-pressure low-volume jet can be used to blast material away from the buried line 210, effectively cutting into the seabed/soil. Alternatively, a low-pressure high-volume jet can be used to fluidise the seabed/soil, allowing the line 210 to be easily removed without significant disturbance to the surrounding environment. The gas/air jet can be used to lift the cut/fluidised seabed away from around the line thus assisting with tension reduction in the line 210 and the maintenance of the line's MBR during these operations.

In the present embodiment the de-trenching apparatus 100 is configured to be pulled along a length of buried subsea cable 210 by a surface vessel. As the de-trenching apparatus 100 is moved along the cable 210, the flared opening 114 at the front end of the channel 112 serves to guide the cable 210 into the body of the apparatus 100. As shown in FIG. 1, the flared opening 114 at the front end of the channel 112 assists in picking up the cable 210 from the bottom of the trench that is opened by the de-trenching apparatus 100. The flared opening 115 at the rear end of the channel 112 has a curved surface that is configured to support the cable 210 during extraction as the cable 210 exits the rear of the apparatus 100. The curved surface acts to limit the minimum bend radius (MBR) of the cable 210 that can occur during the extraction process. The flared opening 115 can therefore help to avoid excessive bending in the cable 210.

In the present embodiment, the curved surfaces of the flared openings 114, 115 at the front and rear ends of the channel 112 are shaped so as to have a radius of curvature r that is greater than or equal to the MBR of the cable 210. This can prevent a situation occurring in which the MBR of the cable 210 is exceeded during the de-trenching operation.

In the present embodiment the channel 112 comprises a linear portion connecting the flared openings 114, 115. In some embodiments the linear portion of the channel 112 may be shortened relative to the lengths of the flared openings 114, 115. In some embodiments the linear portion may be omitted entirely, such that the flared opening 114 at the front of the channel 112 connects directly to the flared opening 115 at the rear of the channel 112 without an intervening liner portion.

By providing flared openings 114, 115 at one or both ends of the apparatus 100, as in the present embodiment, the curvature of the line 210 during de-trenching can be controlled so as to reduce the recovery and peel out tension in the line 210, whilst at the same time ensuring that the MBR of the line 210 is not compromised at any time during the operation.

The body 110 of the de-trenching apparatus 100 may be constructed from any suitable material. For example, in a subsea embodiment the de-trenching apparatus wo may be formed from such material as structural steel, "Weldox", or other strong and wear-resistant steels. Depending on the material used to form the de-trenching apparatus 100, the apparatus may have a significant mass. A higher mass for the de-trenching apparatus can be beneficial, since the higher inertia can assist the apparatus 100 in maintaining its location in the opened trench during a de-trenching operation.

In some embodiments, rear-facing nozzles can be oriented so as to exert a reaction force on the de-trenching apparatus in the direction of travel, helping to align and propel the apparatus along the buried line 210. The number of rear-facing nozzles 142 may be less than the number of front-facing nozzles 141. In the present embodiment, the second material removing means only comprises nozzles 142 near the centre line of the de-trenching apparatus 100. In some embodiments the rear-facing nozzles may be omitted.

In the present embodiment the plurality of nozzles 141, 142 can be connected to a suitable source of pressurised fluid via an umbilical line 222. For example, in a subsea embodiment, the de-trenching apparatus 100 may be connected via an umbilical line 222 to a pump onboard a ship above the de-trenching apparatus 100. Alternatively, in other embodiments the de-trenching apparatus 100 may include a suitable source of pressurised fluid, for example a water pump or a compressed air canister.

Continuing with reference to FIG. 1, in the present embodiment the body 110 of the de-trenching apparatus 100 is configured to be opened so as to permit a continuous length of the cable 210 to be placed into the channel 112. Once the cable 210 has been placed inside the channel 112, the body 110 can then be closed around the cable 210. This allows the de-trenching apparatus to be fitted to a cable 210 without having to cut the cable 210. In the present embodiment the body 110 is split into two halves which are connected by flanges along the longitudinal centre line so as to enable loading/un-loading of the cable 210. For example, the two halves of the body 110 can be joined along the horizontal or vertical axis. The flanges can be joined together by way of a plurality of bolt holes 113.

In some embodiments, at the start of the de-trenching operation the cut end of the line 210 can be threaded through the channel 112 without opening the body 110. Once cable recovery is completed, the body 110 may then be opened to allow the de-trenched line 210 to be removed from the de-trenching apparatus 100. Alternatively, if the entire line 210 is extracted up to a free end of the line 210, the line 210 may be withdrawn from the rear of the de-trenching apparatus 100 without having to open the body 110.

The de-trenching apparatus 100 of the present embodiment further comprises one or more sensors 120 configured to monitor a status of the cable 210 and/or the de-trenching apparatus 100 during a de-trenching operation. The one or more sensors 120 can assist in monitoring the cable de-trenching operation during de-trenching, and can aid cable recovery in poor visibility. The sensors can provide data to a cable recovery vehicle, for example a mother vessel connected to a subsea cable de-trenching apparatus via an umbilical line. For example, the one or more sensors 120 may comprise one or more of:

an imaging sensor configured to capture an image of the line and/or the de-trenching apparatus during the de-trenching operation;
a tension meter configured to measure a tension in the line during the de-trenching operation;
an inclinometer configured to measure an inclination of the de-trenching apparatus during the de-trenching operation;
a sonar sensor configured to detect the line ahead of the de-trenching apparatus during the de-trenching operation; and
an acoustic positioning beacon, such as a responder, transponder or pinger to provide location information about a location of the de-trenching apparatus to a recovery vehicle.

It should be understood that the above sensors are described merely by way of an illustrative example, and in other embodiments different types of sensors may be used. Furthermore, in some embodiments the de-trenching apparatus wo may not include any sensors.

In the present embodiment, the de-trenching apparatus wo is configured for use with subsea cables, and is configured to be deployed from a surface vessel. To enable the de-trenching apparatus 100 to be remotely controlled from the surface vessel, the apparatus 100 can be further provided with an umbilical cable 222 for connecting the de-trenching apparatus 100 to a suitable recovery vehicle, which in the present embodiment can be a surface vessel such as a subsea cable repair ship.

The umbilical cable 222 may perform various functions, depending on the capabilities of the de-trenching apparatus 100. For example, when the de-trenching apparatus 100 comprises one or more on-board sensors 120, the umbilical cable 222 may be configured to carry signals from the one or more sensors 120 to the recovery vehicle. In the present embodiment the umbilical cable 222 is configured to connect the one or more nozzles 141, 142 to a pressurised fluid source on the recovery vehicle.

In some embodiments the de-trenching apparatus 100 may be capable of being supported by a lifting cable 220 that can be controlled by a heave compensation mechanism. For example, this can allow the de-trenching apparatus 100 to be maintained at a constant height and orientation so as to avoid unduly stressing the line 210 during the recovery operation. In the present embodiment the de-trenching apparatus 100 comprises attachment means in the form of a plurality of coupling points 130 to which a lifting cable 220 can be attached. The lifting cable 220 may also be referred to as a bridle. The other end of the lifting cable 220 can be connected to a suitable lifting device, such as a crane or "A" frame, mounted on the repair/recovery vessel. In embodiments in which both a lifting cable 220 and an umbilical cable 222 are present, the umbilical cable 222 may be connected to the lifting cable 220 at a plurality of attachment points 221, such that the umbilical cable 222 is supported by the lifting cable 220.

As described above, in the present embodiment the de-trenching apparatus 100 is connected to a surface recovery vessel via a lifting cable 220 and an umbilical cable 222. The surface vessel can be configured to receive the cable 210 that is extracted by the de-trenching apparatus 100. However, in other embodiments the de-trenching apparatus 100 may be connected via the lifting cable 220 and/or umbilical cable 222 to a different type of vehicle, such as an underwater remotely-operated vehicle (ROV), a manned submersible, or any other suitable vehicle. By connecting the de-trenching apparatus 100 to a submersible vehicle such as an ROV or manned submersible, the length of the lifting cable 220 and umbilical cable 222 can be reduced in comparison to embodiments in which a de-trenching apparatus 100 is connected to a surface vessel.

In embodiments in which the de-trenching apparatus 100 is connected to a submersible such as an ROV, the cable 210 may still be recovered to a suitable recovery vehicle that is separate from the submersible, such as a surface vessel as in the embodiment described above with reference to FIG. 2. In such embodiments, the de-trenching apparatus 100 can be operated via the submersible without requiring a connection between the de-trenching apparatus 100 and the surface vessel. The vehicle from which the de-trenching apparatus 100 is controlled may be referred to as a 'control vehicle', and the vehicle that is used to recover the cable 210 may be referred to as a 'recovery vehicle'. In some embodiments the control vehicle and the recovery vehicle may be the same vehicle, as in the embodiment described above with reference to FIG. 2 in which a surface vessel acts as both the control vehicle and the recovery vehicle.

It should be appreciated that different line 210 can have different handling parameters, such as overall dimensional size, mass, MBR and maximum allowed applied tension. The dimensions of the de-trenching apparatus 100 can be customised for a particular line, or range of lines, with which the de-trenching apparatus 100 is designed to be used. Purely by way of an example, in an embodiment configured for de-trenching a subsea cable with a diameter of 0.25 metres (m), the de-trenching apparatus 100 may comprise an internal channel 112 with a diameter of between 0.5 m and 2 m.

Furthermore, in some embodiments the de-trenching apparatus 100 may be configured for use with cables which include joints 211 at certain points along the cable 210. For example, a joint 211 in a subsea cable 210 may comprise a straight section around 2 m in length plus 2 m tapered bend restrictors on each end. To enable a joint 211 to pass freely through the de-trenching apparatus 100, the internal diameter of the channel 112 may be around 3× the maximum diameter of the joint 211. By making the internal diameter of the channel 112 larger than the maximum diameter of the joint 211, a certain degree of mis-alignment between the de-trenching apparatus wo and the joint 211 can be accommodated without the de-trenching apparatus wo binding on the joint 211 and becoming stuck.

Embodiments of the present invention can enable buried lines to be uncovered and extracted for repair in a safe and controlled manner, without causing further damage to the line. This can allow the length of line that has been recovered to be re-used after the de-trenching operation has been completed. In addition, embodiments of the invention can minimise the extent of disturbance of the surrounding environment, since any disturbance of the ground or seabed is localised to a short swathe immediately either side of the line. The flared openings on either side of the de-trenching apparatus wo provide MBR control and tension reduction during all phases of the de-trenching and recovery operations.

Whilst certain embodiments of the invention have been described herein with reference to the drawings, it will be understood that many variations and modifications will be possible without departing from the scope of the invention as defined in the accompanying claims.

The invention claimed is:

1. De-trenching apparatus and a buried cable or pipeline having a minimum bend radius, the de-trenching apparatus being configured to extract the buried cable or pipeline, the apparatus comprising:
   a channel configured to receive the buried cable or pipeline to be extracted, the channel comprising a first flared opening at a front end of the de-trenching apparatus and a second flared opening at the rear end of the de-trenching apparatus, the first and second flared openings each having an internal curved surface configured to support the cable or pipeline during extraction, wherein the internal curved surface of the first and/or the second flared openings have a radius of curvature greater than or equal to the minimum bend radius of the cable or pipeline to be extracted; and
   material removal means for removing material from around the buried line ahead of the de-trenching apparatus.

2. The de-trenching apparatus and buried cable or pipeline of claim 1, wherein the material removal means comprises one or more nozzles configured to direct one or more fluid jets towards the material to be removed.

3. The de-trenching apparatus and buried cable or pipeline of claim 2, wherein the one or more nozzles are oriented such that a reaction force exerted on the de-trenching apparatus by the one or more fluid jets assists in aligning with and/or propelling the de-trenching apparatus along the buried cable or pipeline.

4. The de-trenching apparatus and buried cable or pipeline of claim 2, wherein the one or more nozzles are configured to be connected to a pressurised fluid source to generate the fluid jet to lift the material from around the buried cable or pipeline.

5. The de-trenching apparatus and buried cable or pipeline of claim 4, further comprising:
   the pressurised fluid source, connected to the one or more nozzles.

6. The de-trenching apparatus and buried cable or pipeline of claim 4, further comprising:
   an umbilical cable for connecting the de-trenching apparatus to a control vehicle, wherein the umbilical cable is configured to connect the one or more nozzles to the pressurised fluid source on the control vehicle.

7. The de-trenching apparatus and buried cable or pipeline of claim 1, wherein the body is configured to be opened so as to permit a continuous length of the buried cable or pipeline to be placed into the channel, the body then being closed around the cable or pipeline.

8. The de-trenching apparatus and cable or pipeline of claim 1, further comprising:
   one or more sensors configured to monitor a status of the cable or pipeline and/or the de-trenching apparatus during a de-trenching operation.

9. The de-trenching apparatus and cable or pipeline of claim 8, wherein the one or more sensors comprise at least one of:
   an imaging sensor configured to capture an image of the cable or pipeline and/or the de-trenching apparatus during the de-trenching operation; and/or
   a tension meter configured to measure a tension in the cable or pipeline during the de-trenching operation; and/or
   an inclinometer configured to measure an inclination of the de-trenching apparatus during the de-trenching operation; and/or
   a sonar sensor configured to detect the buried cable or pipeline during the de-trenching operation; and/or
   an acoustic positioning beacon to provide location information about a location of the de-trenching apparatus to a control vehicle and/or a recovery vehicle.

10. The de-trenching apparatus and buried cable or pipeline of claim 8, further comprising:
    an umbilical cable for connecting the de-trenching apparatus to a control vehicle, wherein the umbilical cable is configured to carry signals from the one or more sensors to the control vehicle.

11. The de-trenching apparatus and buried cable or pipeline of claim 1, further comprising:
    an umbilical cable for connecting the de-trenching apparatus to a control vehicle.

12. A recovery system for extracting a buried line, the system comprising:
    the de-trenching apparatus and buried cable or pipeline according to claim 11; and
    a control vehicle connected to the de-trenching apparatus by the umbilical cable and/or by a lifting cable.

13. The recovery system according to claim 12, wherein the control vehicle is a submersible vehicle.

14. The recovery system according to claim 12, wherein the control vehicle is a surface vessel configured to receive the buried cable or pipeline extracted by the de-trenching apparatus.

15. The de-trenching apparatus and buried cable or pipeline of claim 1, further comprising:
    attachment means configured to attach the de-trenching apparatus to a lifting cable for supporting the de-trenching apparatus during a de-trenching operation.

16. The de-trenching apparatus and buried cable or pipeline of claim 15, further comprising:
- an umbilical cable for connecting the de-trenching apparatus to a control vehicle, wherein the umbilical cable is connected to the lifting cable at a plurality of attachment points such that the umbilical cable is supported by the lifting cable.

17. A de-trenching apparatus configured to extract a buried cable or pipeline having a minimum bend radius, the de-trenching apparatus comprising:
- a channel configured to receive the buried cable or pipeline to be extracted, the channel comprising a first flared opening at a front end of the de-trenching apparatus and a second flared opening at the rear end of the de-trenching apparatus, the first and second flared openings each having an internal curved surface configured to support the cable or pipeline during extraction, wherein the internal curved surface of the first and/or the second flared openings have a radius of curvature greater than or equal to the minimum bend radius of the cable or pipeline to be extracted; and
- material removal means for removing material from around the buried line ahead of the de-trenching apparatus.

* * * * *